US008760856B2

(12) United States Patent
Janz

(10) Patent No.: US 8,760,856 B2

(45) Date of Patent: Jun. 24, 2014

(54) COMBINATION SUPPORT BASE AND PRINTER FOR PORTABLE COMPUTERS

(76) Inventor: Gary A. Janz, Fresno, CA (US)

( * ) Notice: Subject to any disclaimer, the term of this patent is extended or adjusted under 35 U.S.C. 154(b) by 0 days.

(21) Appl. No.: 12/151,970

(22) Filed: May 9, 2008

(65) Prior Publication Data

US 2013/0335498 A1 Dec. 19, 2013

(51) Int. Cl.
*G06F 1/16* (2006.01)

(52) U.S. Cl.
USPC ............. 361/679.02; 361/679.26; 361/679.27

(58) Field of Classification Search
None
See application file for complete search history.

(56) References Cited

U.S. PATENT DOCUMENTS

| | | | | | |
|---|---|---|---|---|---|
| 5,186,557 | A | * | 2/1993 | Fushimi | 400/691 |
| 5,209,583 | A | | 5/1993 | Lewis et al. | |
| 5,345,403 | A | * | 9/1994 | Ogawa et al. | 361/679.26 |
| 5,364,196 | A | * | 11/1994 | Baitz et al. | 400/691 |
| 5,443,320 | A | * | 8/1995 | Agata et al. | 400/715 |
| D391,929 | S | | 3/1998 | Inoue | |
| 5,845,144 | A | * | 12/1998 | Tateyama et al. | 712/1 |
| 6,049,450 | A | | 4/2000 | Cho et al. | |
| 6,119,184 | A | * | 9/2000 | Takahama | 710/303 |
| 6,219,227 | B1 | | 4/2001 | Trane | |
| 6,626,597 | B2 | | 9/2003 | Fujiwara | |
| 6,781,823 | B1 | * | 8/2004 | Nyack | 361/679.29 |
| 7,036,925 | B2 | | 5/2006 | Fujiwara | |
| 7,280,345 | B2 | * | 10/2007 | Park | 361/679.01 |
| 7,474,524 | B1 | * | 1/2009 | Shaw | 361/679.02 |
| 7,542,284 | B1 | * | 6/2009 | Wilson, Sr. | 361/679.45 |
| 2008/0310869 | A1 | * | 12/2008 | Iftime et al. | 399/51 |

OTHER PUBLICATIONS

Pentax PocketJet 3 Mobile Printer (Black), Amazon. Com, Jan. 4, 2008, 5 pages, Internet, US.

* cited by examiner

*Primary Examiner* — Anthony Q Edwards
(74) *Attorney, Agent, or Firm* — Richard A. Ryan

(57) ABSTRACT

A combination support base and printer apparatus for use with laptop and other portable computers is easy to carry and particularly configured for letter or larger sized paper. The invention comprises a base having a bottom wall and a plurality of peripherally disposed upstanding walls that define paper storage and printer compartments, a lid to enclose one or both compartments, an upwardly disposed support surface on the lid for placement of the laptop thereon and a printer module disposed inside the printer compartment to print on paper pulled from the paper storage compartment. The support surface can be configured with various non-slip materials to reduce the laptop slipping relative to the lid. An attachment mechanism can be utilized to clamp the laptop to the lid. Side wings can be used to effectively expand the width of the support surface. A paper sizing mechanism can adjust for different paper sizes.

24 Claims, 7 Drawing Sheets

COMBINATION SUPPORT BASE AND PRINTER FOR PORTABLE COMPUTERS

CROSS-REFERENCE TO RELATED APPLICATIONS

None.

STATEMENT REGARDING FEDERALLY SPONSORED RESEARCH

Not Applicable.

BACKGROUND OF THE INVENTION

A. Field of the Invention

The field of the present invention generally relates to peripheral devices utilized with computers, particularly portable computers such as laptop computers and the like. More particularly, the present invention relates to printers that are configured to be easily transported and utilized with portable computers in various locations. Even more particularly, the present invention relates to such printers that are configured as a self-contained printer unit having a full-sized paper tray and which can support the portable computer thereon.

B. Background

Over the last twenty years or so, the computer has become an important and generally necessary tool that is commonly utilized for business, home, educational and recreational purposes. Relatively early in the history of computers, certain companies realized that it would be beneficial to be able to transport the computer to places away from the office or home in order to utilize the computer at a "remote" location. As a result, those in the computer industry developed portable computers, which are now commonly referred to as laptop computers. The portability of a laptop computer allows the user to perform tasks on the computer in many non-traditional work locations, including at a client's or customer's place of business or home, in a car, truck, boat or other vehicle and at an outdoor job site, a sporting event or a wide variety of other locations. While laptop computers greatly improve the ability of the user to perform computer-related tasks away from the typical office or home setting, there are known issues with regard to transporting the laptop computer to the desired location, finding a suitable support surface on which to place the laptop computer and having adequate space to work on the laptop computer. To complicate the remote use of laptop computers, utilization of the laptop computer is generally made more beneficial by being able to utilize various peripheral equipment and work materials with the computer. For instance, many people find it useful to connect the laptop computer to a printer so that he or she may print documents, including but not limited to forms, receipts, designs, bids, contracts and the like, at the remote location. Transporting the laptop computer and the printer, as well as all of the necessary cables, paper and other accessories to the desired location can be quite cumbersome. In addition, once at the remote location the user typically finds himself or herself significantly limited on space and often without a suitable surface on which to place the laptop computer.

Various portable printers have been available for use with laptop and other portable computing devices. Many of the printers that are marketed or otherwise identified as being portable derive their alleged portability from the fact that they are powered by or may be selectively powered by internal batteries. As is readily apparent to those who utilize such printers, having a printer that is free from the need to connect to an outlet does not necessarily make the printer easy to transport. In fact, many of the so-called portable printers are relatively heavy and bulky, such that transporting the printer with a laptop computer requires the user to handle a separate, often odd-shaped carrying case. This typically results in the user having to carry his or her laptop in a laptop compatible case, usually in the form of an expanded briefcase or the like, and the printer carrying case. One advantage of these larger-sized portable printers is that they are configured to print documents on the standard 8½" by 11" letter sized paper. Some of these printers are also capable of printing on legal sized (8½" by 14") or larger sized paper.

More recently, the computer industry has developed portable printers which are lighter, smaller and less bulky, making them much easier to transport and use with portable computers. One such printer is the Pocketjet® 3 mobile printer from Pentax. This printer utilizes thermal printing technology, weighs approximately four pounds, has dimensions of 2.2" by 10" by 1.2" and utilizes built-in rechargeable nickle-metal hydride (NiMH) batteries. Due to its size, this printer is capable of printing documents on letter, legal and A4 thermal paper. Because the printer does not have paper storage capability, the paper has to be fed into the printer one sheet at a time or supplied in a continuous or perforated roll. The printer connects to the user's laptop or other computer via USB cable or integrated Bluetooth technology. Companies such as Brother, Fuji and Sony are marketing very small portable printers that, like the Pentax printer, generally rely on thermal printing technology to produce the printed document. Typically, these printers are hand-held devices that print documents or photographs on smaller sized paper, such as the postcard sized A6 paper, 4" by 6" photograph paper or card-sized paper. Due to their size, they are generally not suitable for printing documents on letter or larger sizes of paper. While thermal printing technology has certain benefits with regard to the size of the printer and not requiring ink, many people do not like documents, particularly important business or legal documents, printed on thermal printing paper. In addition, while the small size of the smaller portable printers has advantages with regard to transportability, they are not necessarily easy to utilize in the field, on a job site or other locations where handling and placement of the small, separate printer creates its own difficulties.

In addition to the foregoing, various portable printers have been the subject of issued patents. For instance, U.S. Pat. No. 5,209,583 to Lewis, et al. describes a compact printer for portable teletransaction computers or data terminals that comprises a computer receiving well which restricts the orientation of the computer when the computer connector is being engaged by the printer connector. U.S. Pat. No. 7,036,925 to Fujiwara describes a very small printer that has hooks which hook on to the top of the display panel of a laptop computer and a housing configured to hold A6 or A7 size paper. U.S. Pat. No. 6,626,597 to Fujiwara describes a thin, compact printer that utilizes thermal technology to print on paper which is fed into the printer. Because no paper storage tray is provided with this printer, individual or rolled sheets of paper must be fed into the printer feed mechanism. U.S. Pat. No. 6,219,227 to Trane describes a portable computer assembly having the laptop computer incorporated therein such that the paper tray is positioned below the computer keyboard and processor, a printing device is attached to the side of the computer to receive paper from the paper tray and the computer monitor is incorporated into the cover lid. A portable telephone is releasably secured to the main outer casing and electrically connected to the computer.

Another product frequently utilized with laptop and other portable printers to improve their functionality are laptop lap desks and other portable desk or desk-like products. As their name implies, laptop lap desks are generally sized and configured to support a laptop computer in the lap of the person utilizing the laptop computer. Typically, laptop lap desks are made out of materials to prevent the heat from the computer transferring to the user's lap and are specifically formed and/or shaped to allow air to circulate around the computer and into its fan system. Some of the commercially available laptop desks have internal storage capability and a pivoting or extendable mouse pad for use with the computer's mouse. Other portable desks are primarily configured to be placed on another, typically less suitable, surface so as to provide the user with a generally planar work surface on which to work. Some of the portable desks have internal storage compartments for storing work supplies, including books, pens, paper, forms and the like. Some portable desks and like structures, particularly those specially configured for laptops, have an upwardly facing support surface that is adapted to beneficially support a laptop computer, such as having slide-resistant materials on the surface or one or more lips that prevent the laptop from sliding off of the desk or structure. While the various portable desks and the like solve the problem of providing a working surface, they do not address the issue of having the additional space required for a portable printer, particularly a portable printer that is capable of printing standard letter size or large paper and which has a stored supply of such paper.

Despite the foregoing, what is needed is a small compact printer that provides a work surface on which the user may place a laptop or other portable computer to interact with the printer and print documents and/or other materials therefrom. The desired printer should be relatively lightweight and small so as to be easily transported with the laptop computer. The preferred printer should have a profile which conveniently fits into a laptop computer case, briefcase or other similarly configured cases and be configured to store a supply of letter sized or larger paper for printing on by the printer. Preferably, such a printer should be configured to communicate with a laptop computer to receive printing instructions therefrom via wired or wireless means, as desired by the user. The preferred printer will be suitable for use with various printing mechanisms, including but not limited to ink jet, laser, thermal and other printing devices and be configured to feed paper from a paper storage area to the user.

SUMMARY OF THE INVENTION

The combination support base and printer for portable computers of the present invention solves the problems and provides the benefits identified above. That is to say, the present invention discloses a printer which is configured with a storage area to store paper for use by the printer and a support surface on which the user can place a laptop or other portable computer. The combination support base and printer of the present invention is configured to be relatively lightweight and small in size so as to be easily portable. In a preferred embodiment, the combination support base and printer is shaped so as to easily fit inside a laptop carrying case with the laptop computer or in a briefcase or similar small case. The combination support base and printer is configured with a paper storage compartment that is sized to store a plurality of sheets of letter sized paper or, if desired, larger sizes of paper. The support base and printer of the present invention is adaptable for use with a variety of different types of printing devices, including but not limited to ink jet, laser and thermal printing mechanisms. The combination support base and printer allows the user to support the computer on a support surface while using the computer to print documents or other materials from the printer mechanism incorporated in the support base via wired or wireless connection between the computer and printer. The support base and printer of the present invention is adaptable for use with mechanisms to adjust the size of the paper storage compartment for different sizes of paper, attach the laptop computer to the support surface and/or adjustable wing supports to selectively expand the width of the support surface.

In a one embodiment of the present invention, the combination support base and printer comprises a base having a paper storage compartment and a printer compartment, a lid to engage the base and enclose at least the paper storage compartment and a printer module in the printer compartment to print on and then eject paper pulled from the paper storage compartment. In a preferred embodiment, the base has a bottom wall and a first sidewall, a second sidewall, a front wall and a rear wall peripherally disposed about the bottom wall. The bottom wall, sidewalls and front wall define the paper storage compartment and the bottom wall, sidewalls and rear wall define the printer compartment. The paper storage compartment is configured to store a plurality of sheets of paper therein. In the preferred embodiment, the lid is pivotally attached to the rear wall of the base and configured to enclose both the paper storage compartment and the printer compartment when the lid is placed in its closed position and to allow access both compartments when the lid is in its open position. The lid has an upwardly disposed support surface that is sized and configured to support the portable computer thereon when the lid is in its closed position. The lid is supported by the sidewalls or by the front wall so as to support the portable computer when it is placed on the lid. In the preferred embodiment, each of these walls support the lid. The lid can have a non-slip material applied to the support surface to reduce the likelihood the computer will slip relative to the lid or the lid can be manufactured so as to have non-slip features integrally formed with the support surface. Alternatively, or in conjunction with the non-slip features, the support base/printer can include an attachment mechanism configured to attach the portable computer to the support surface. In a preferred embodiment, the attachment mechanism securely clamps the portable computer to the lid. The printer module is configured to pull one of the sheets of paper from the paper storage compartment into the printer module, print on the sheet of paper and then discharge it out the base. Various types of printing apparatuses, including inkjet, laser and thermal printing systems, can be incorporated into the printer module. A battery, such as a lithium-ion battery, can supply power to the printer module. In a preferred embodiment, a paper guide at the rear wall of the base is in communication with the printer module to receive and support the sheet of paper that is discharged by the printer module. One or more side expansion wings, adjustably attached to the lid or the base, can be utilized to effectively expand the width of the support surface to provide better support for the portable computer. A paper sizing mechanism can be utilized in the paper storage compartment to adjust the size thereof for different sizes of paper.

Accordingly, one of the primary aspects of the present invention is to provide a portable printer that has the advantages discussed above and overcomes the disadvantages and limitations associated with presently available portable printers.

It is also an important aspect of the present invention to provide a portable printer configured as a base structure having an internal paper storage compartment and a lid to support a laptop or other portable computer on an upwardly facing support surface of the lid.

It is also an important aspect of the present invention to provide a combination support base and portable printer for use with laptop and other portable computers that has a support surface configured to engage the laptop to prevent movement relative thereto, a paper storage compartment inside the base configured to store a plurality of sheets of paper and a printer module inside the base configured to retrieve one sheet of paper and print thereon.

It is also an important aspect of the present invention to provide a combination support base and portable printer that is adaptable for use with one or more attaching mechanisms to attach the laptop to the support base, one or more adjustable wing supports to expand the width available for supporting a laptop computer and/or paper sizing mechanisms that adjust the size of the paper storage compartment for different sizes of paper.

Another important aspect of the present invention is to provide a combination support base and portable printer configured to be easily transported with a laptop or other portable computer in a computer carrying case, briefcase or like cases.

Yet another important aspect of the present invention is to provide a combination support base and portable printer that comprises a base having a support surface, a printer module disposed inside the base and a paper storage compartment sized to hold a plurality of letter or larger sized sheets of paper.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are merely illustrative of one or more of the preferred embodiments and, as such, represent one or more ways of configuring the present invention. Although specific components, materials, configurations and uses are illustrated, it should be understood that a number of variations to the components and to the configuration of those components described herein and in the accompanying figures can be made without changing the scope and function of the present invention. For instance, although the various figures and the description provided herein are directed to certain configurations of a portable computer, namely a laptop computer, and certain size relationships between the laptop computer and the support base, those skilled in the art will readily understand that this is set forth merely for purposes of simplifying the present disclosure and that the present invention is not so limited.

Figure 1:
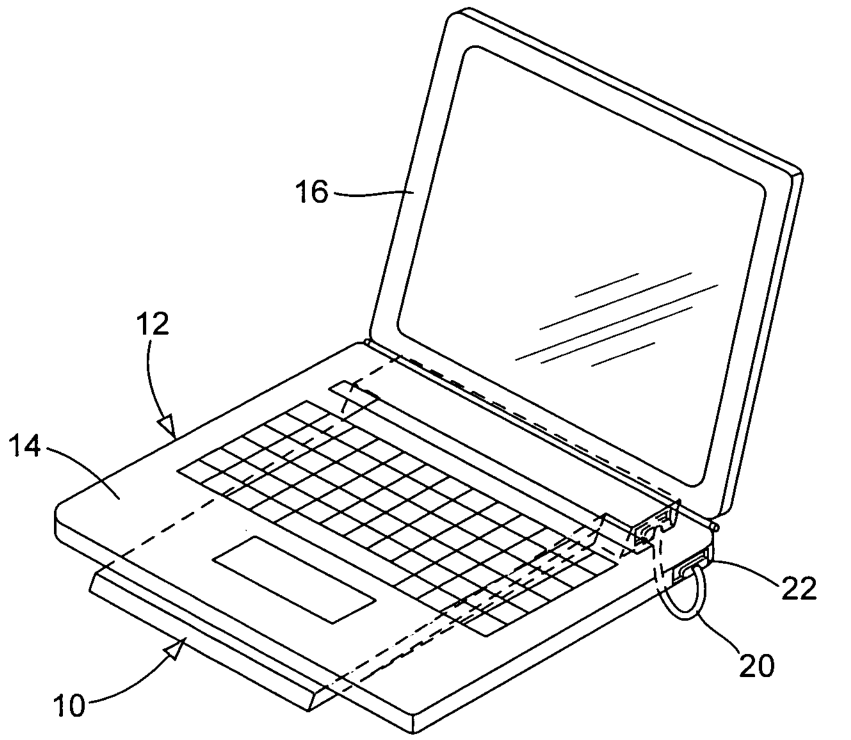
FIG. 1 is a side perspective view of a combination support base and printer configured according to a preferred embodiment of the present invention shown in use with a laptop computer thereon.
Figure 9:
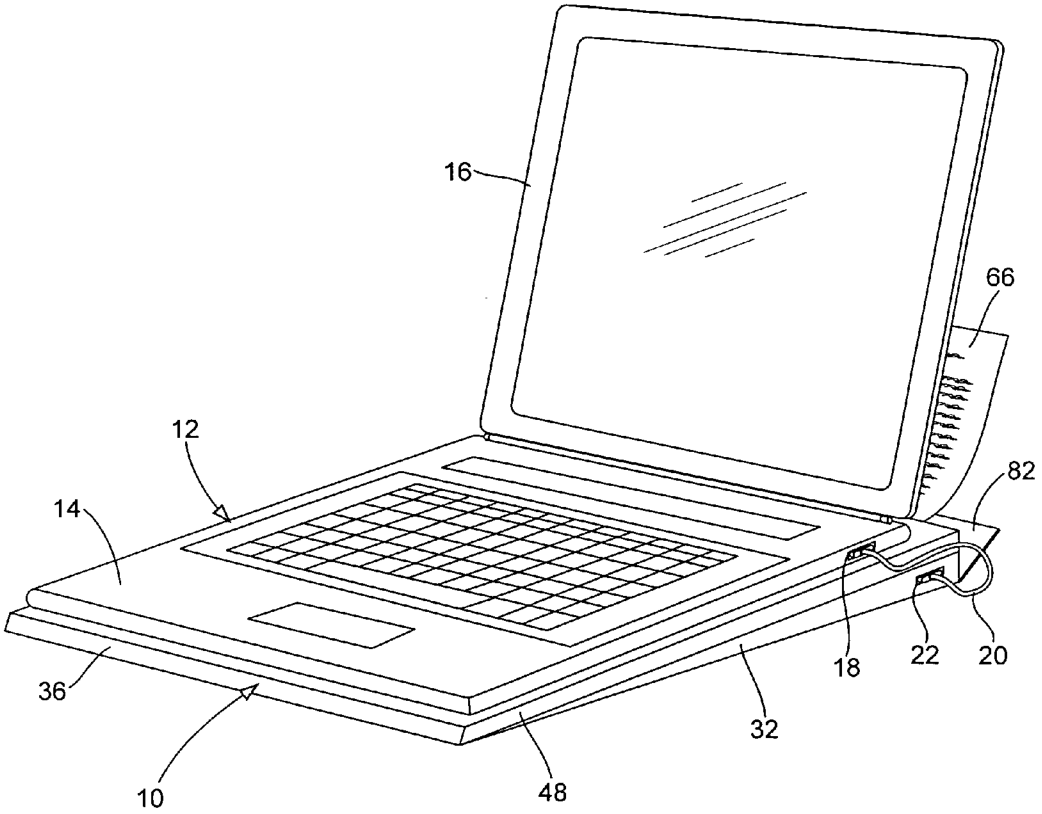
FIG. 9 is a side perspective view of another alternative embodiment of the combination support base and printer of the present invention shown in the closed position with a laptop computer supported thereon and paper being fed out the support base.

A combination support base and printer that is manufactured out of the components and configured pursuant to various preferred embodiments of the present invention is shown generally as 10 in the figures. As best shown in FIGS. 1 and 9, combination base/printer 10 is primarily intended to be utilized with a portable computer 12, such as the laptop shown in the figures, to support portable computer 12 thereon during use and to provide printing capabilities for the user. As well known in the art, laptop computer 12 comprises a computing portion 14, having alphanumeric keyboard, scrolling device, a plurality of function keys and other keys and/or buttons, and a display portion 16 having a screen. Although the portable computer 12 shown in the figures is a typically configured laptop computer, the base/printer 10 can be utilized with non-standard laptops and other types of computing devices or devices having computer-like capability, include PDAs and certain cellular telephones. As such, the term "portable computer" is intended to incorporate each of these types of computing devices. Although not likely to be supportable on the base/printer 10 of the present invention and not particularly beneficially utilized therewith, the base/printer 10 can be operatively connected to and utilized with a desktop computer system (not shown) to print documents or other materials generated by such a system.

Various types of communication mechanisms can be utilized with the base/printer 10 of the present invention to operatively connect it to the portable computer 12 so that electronic signals transmitting printing information may be sent from the portable computer 12 to the base/printer 10 to print a document or other material (i.e., photographs, drawings, forms and etc.). In the embodiments shown in the figures, the communication mechanism for base/printer 10 is a USB port 18 that connects, via USB cable 20, to a USB port 22 on portable computer 12. Although the various embodiments shown in the figures utilize USB cable 20 as the communication mechanism to interconnect portable computer 12 and base/printer 10, the present invention is not so limited. For instance, the communication mechanism can be a variety of other hardwire devices, such as a printer cable, firewire cable or a variety of other types of wire-type connectors available in the electronics industry to connect a peripheral device, such as a printer, to a computer. For the present invention, however, the preferred communication mechanism to operatively connect portable computer 12 to base/printer 10 is a wireless device. As well known, wireless devices eliminate the need to have a cable, including USB cable 20, interconnecting the portable computer 12 and base/printer 10, thereby eliminating the need to carry and keep track of the cable and eliminates the clutter associated with use of the cable.

A variety of wireless digital or analog interfaces or connection systems are available for wirelessly connecting portable computer 12 to the base/printer 10. One type of such wireless communication is the use of infrared (IrDA) light transmitters and receivers. Such devices are of limited acceptability, however, due to directional and visual problems that are known to exist with IrDA systems. Until relatively recently, the most common configuration for short range RF systems has been the IEEE 802.11 (or Wi-Fi) based radio frequency. To provide more secure and functional wireless transmission between closely positioned devices, the communications industry developed Bluetooth (which is a trademark owned and controlled by Bluetooth SIG, Inc.) as a wireless technology standard that utilizes the unlicensed 2.4 Ghz radio spectrum. In a relatively short period of time, the Bluetooth standard for wireless piconet systems has become very well known. Information about Bluetooth is available from many different sources, including from the Internet at www.bluetooth.com. In general, Bluetooth network technology is an open, worldwide specification for wireless communication of data and voice that is based on a low-cost, short-range radio link which allows wireless communication over a typical range of up to approximately 100 feet. As well known, Bluetooth technology has been incorporated into a variety of devices for various uses, including as a wireless interface between computers and their associated printers. For the reasons set forth above, therefore, the presently preferred communication mechanism is the Bluetooth technology. It is anticipated that, over time, improved communication mechanisms may be developed by the computer industry to replace Bluetooth technology as the preferred communication mechanism.

Figure 2:
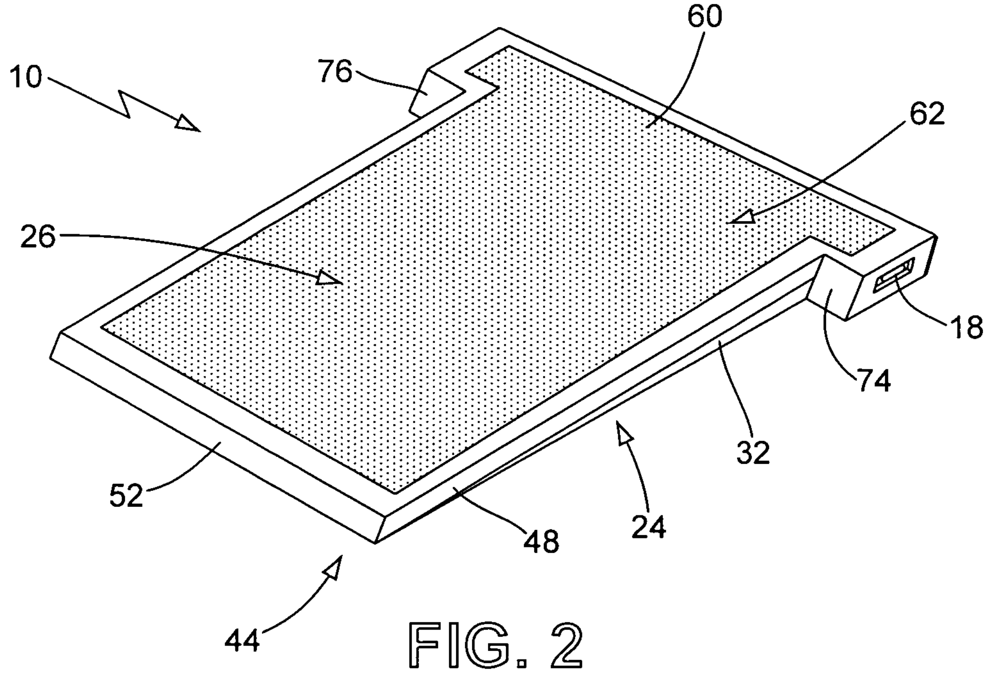
FIG. 2 is a side perspective view of the combination support base and printer of FIG. 1 shown in its closed position.
Figure 3:
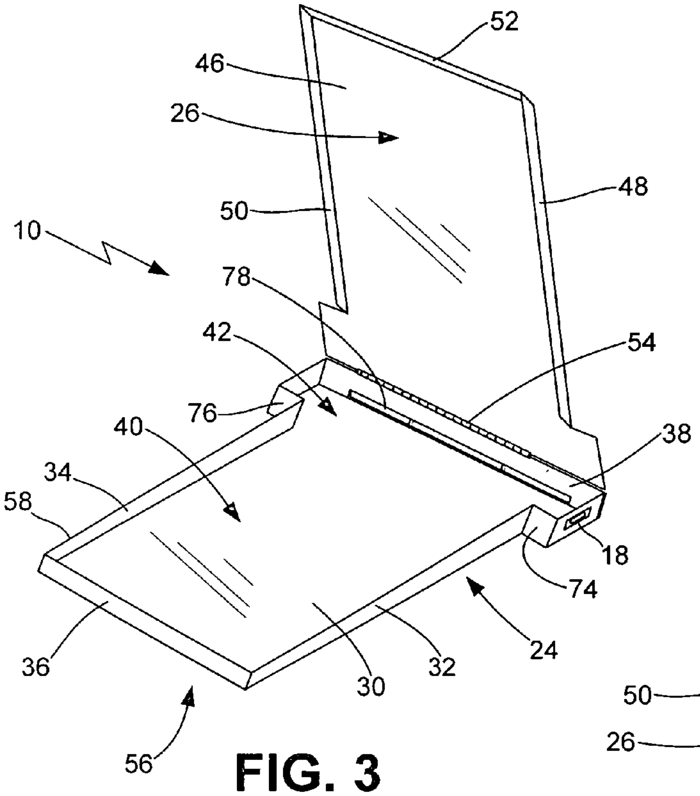
FIG. 3 is a side perspective view of the combination support base and printer of FIG. 1 shown in its open position without a printer module or any paper in the paper storage compartment.
Figure 4:
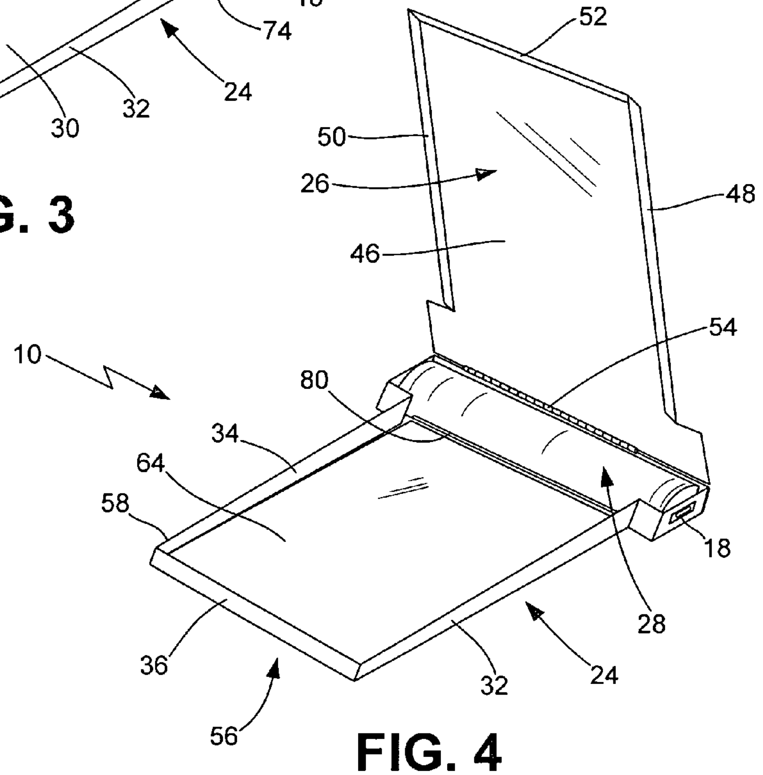
FIG. 4 is a side perspective view of the combination support base and printer of FIG. 3 shown with the printer module in the printer compartment and with paper in the paper storage compartment.
Figure 5:
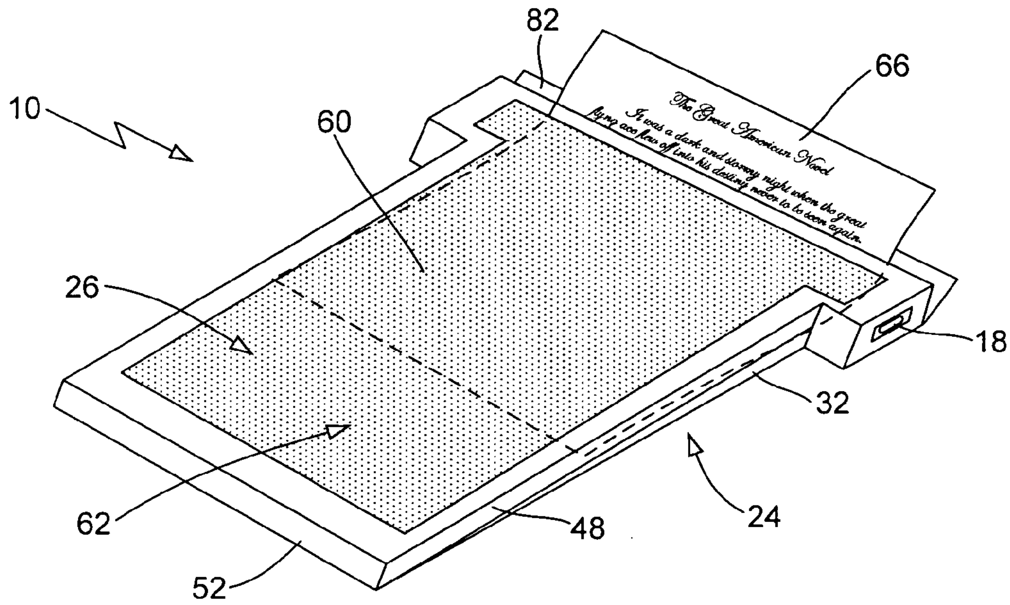
FIG. 5 is a side perspective view of the combination support base and printer of FIG. 2 shown with the primary paper guide open and paper being fed through the printer module and out the support base.
Figure 12:
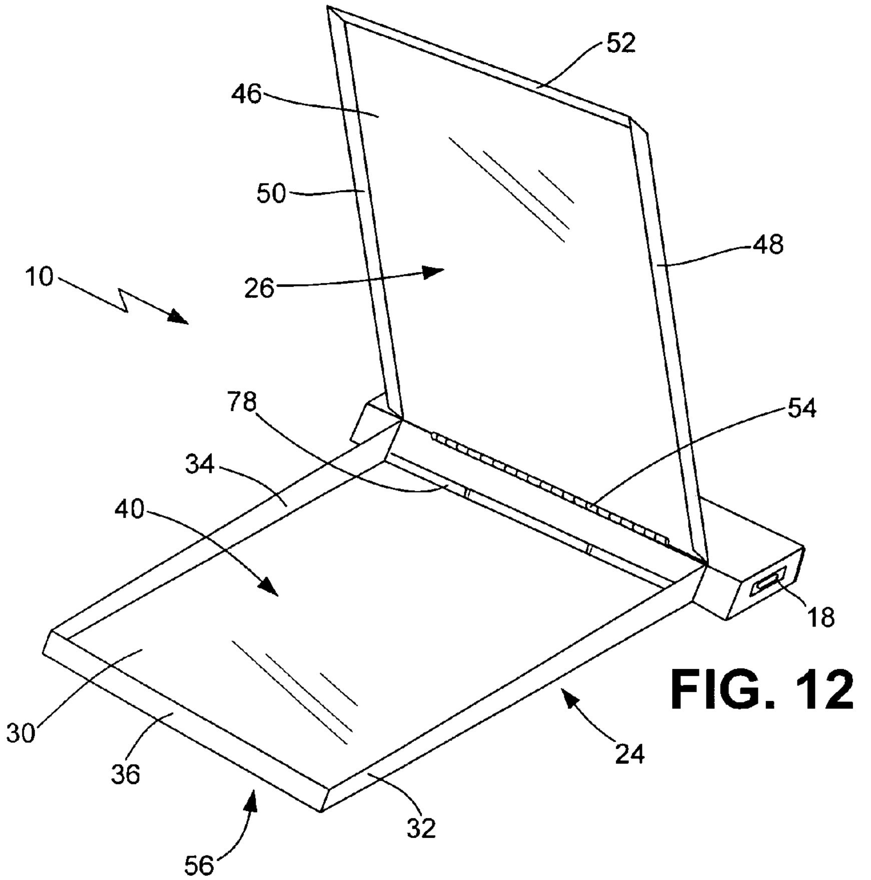
FIG. 12 is a side perspective view of another alternative embodiment of the support base and printer of the present invention with the lid shown in the open position.
Figure 13:
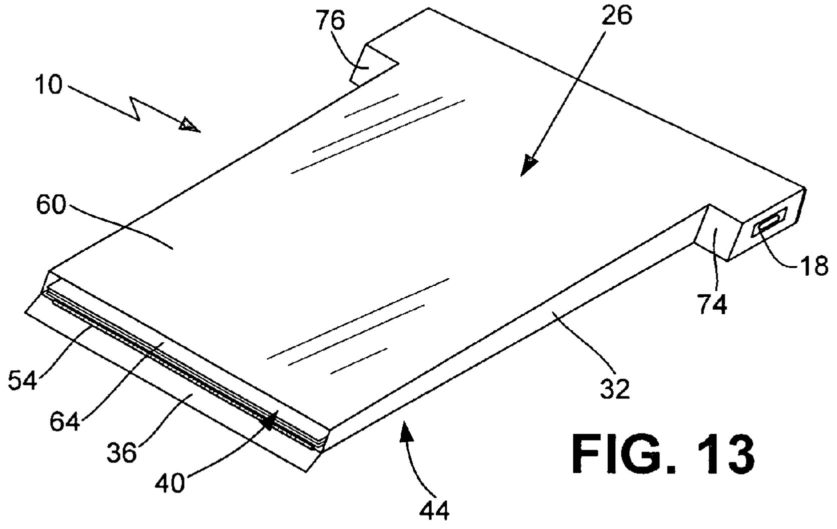
FIG. 13 is a side perspective view of another alternative embodiment of the support base and printer of the present invention shown with a pivoting front wall to allow access to the paper storage compartment.

As best shown in FIGS. 2 through 5, the preferred embodiment of the base/printer 10 of the present invention primarily comprises a base 24, lid 26 and printer module 28. The base 24 has a bottom wall 30 with one or more, typically a plurality, of peripherally disposed upstanding walls, such as first sidewall 32 and opposing second sidewall 34 and front wall 36 and opposing rear wall 38. As set forth in more detail below and best shown in FIGS. 3 and 4, sidewalls 32/34 and the front/rear walls 36/38 generally define a paper storage compartment 40 and a printer compartment 42, which are enclosed by lid 26 when it is in its closed position 44, as best shown in FIGS. 1, 2 and 5. In a preferred embodiment of the present invention, lid 26 has a top wall 46 and one or more peripherally disposed edge members attached thereto, such as first side edge member 48, second side edge member 50 and front edge member 52, as best shown in FIGS. 3 and 4. As is also shown in these figures, the preferred embodiment lid 26 is pivotally connected to rear wall 38 by hinge 54 to allow the user to move lid 26 between its closed position 44 enclosing the paper storage compartment 40 and the printer compartment 42, shown in FIGS. 1, 2 and 5, and its open position 56, shown in FIGS. 3 and 4, allowing user access to the printer storage compartment 40 and the printer compartment 42. In this embodiment, the top wall 46 is configured to abut against the upper edge 58 of the sidewalls 32/34 and the front wall 36 with the side edge members 48 and 50 along sidewalls 32/34, respectively, and front edge member 52 over the front wall 36 when lid 26 is in its closed position 44, as best shown in FIGS. 2 and 5. As will be readily apparent to those skilled in the art, numerous other configurations for base 24 and lid 26, and the relationship between the various components thereof and their respective positions in closed position 44 and open position 56, are also suitable for use with base/printer 10 of the present invention. As set forth below, examples of alternative configurations are shown in FIGS. 12 and 13. In each of the configurations, it is important that lid 26 be sufficiently supported, such as by the upper edge 58 of sidewalls 32/34 and front wall 36, so that lid 26 can in turn support the weight of portable computer 12 thereon when lid 26 is in its closed position 44. As well known in the art, base 24 and lid 26 can be made out of a variety of different materials. In one preferred embodiment, base 24 and lid 26 are made out of plastic utilizing an injection molding process. Alternatively, base 24 may be manufactured out of a variety of other lightweight but strong materials, including composites and certain metals, such as aluminum and the like. Other materials and processes can also be utilized.

Figure 6:
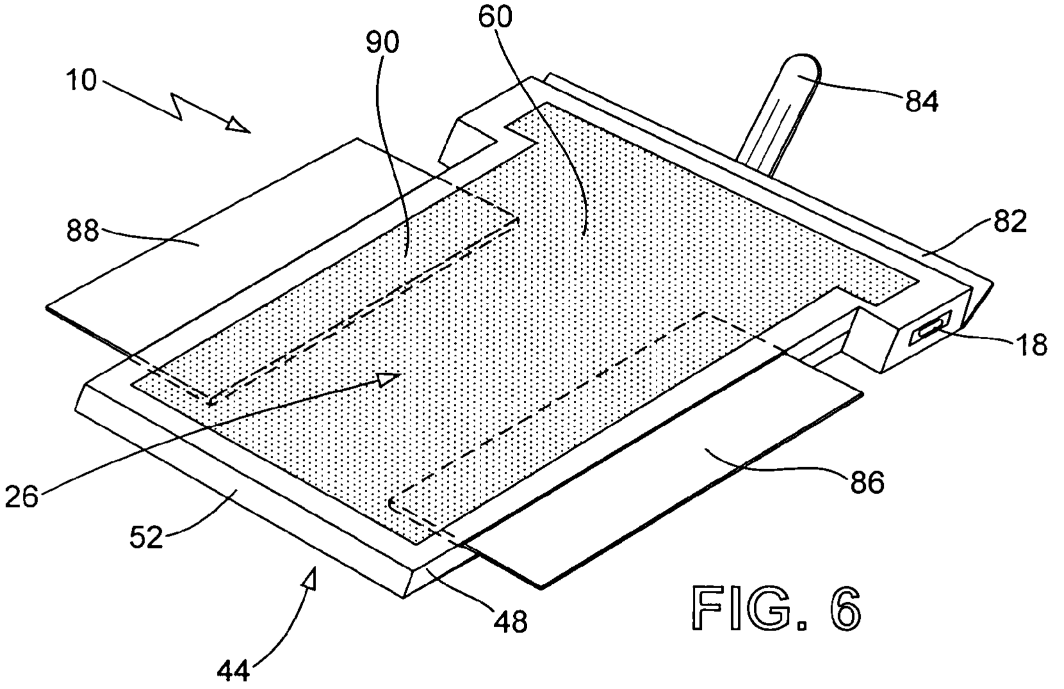
FIG. 6 is a side perspective view of an alternative configuration of the combination support base and printer of FIG. 2 shown with adjustable wing supports and a secondary paper guide.

Lid 26 has an upwardly disposed support surface 60, best shown in FIGS. 2 and 5, on which the portable computer 12 is placed during use of base/printer 10 of the present invention. In a preferred embodiment, support surface 60 of lid 26 is generally planar to support portable computer 12 in a stable manner, thereby preventing undesirable rocking or other movement of portable computer 12 during its use. To prevent sliding movement of portable computer 12 relative to support surface 60, a non-slip mechanism (shown as the dot pattern in FIGS. 2, 5, 6 and 8 and identified as 62) is added to or manufactured integral with support surface 60. In the embodiment of FIGS. 2, 5 and 6, the non-slip mechanism 62 is disposed over nearly the entire support surface 60 of lid 26. In the embodiment shown in FIG. 8, the non-slip mechanism 62 is disposed only over certain portions of support surface 60. In one embodiment, the non-slip mechanism 62 is a non-slipping material, such as a foam or foam-like material or a sandpaper-like material (commonly utilized on other computer related support surfaces and surfaces where people will be walking or stepping and which may be wet) that is applied to the support surface 60 using an appropriate adhesive or other means of securing the non-slipping material to the support surface 60. In another embodiment, the non-slip mechanism 62 is part of the injection molding process of manufacturing lid 26. The non-slip mechanism 62 should substantially prevent sliding movement of portable computer 12 by engaging the bottom of the computing portion 14 of portable computer 12 so that portable computer 12 will not easily slide off of base/printer 10 during use. Alternatively, each of portable computer 12 and support surface 60 can be cooperatively configured with a mechanical attachment non-slip mechanism 60 that securely attaches portable computer 12 to support surface 60. For instance, at least one of the support surface 60 and the bottom surface of portable computer 12 can be provided with one or more outwardly projecting engagement members and the other surface can be provided with a cooperatively configured engagement aperture to engage the projecting member. Various other mechanical securing mechanisms for the respective surfaces are also known or readily apparent to those skilled in the art. An example of another type of securing mechanism to secure portable computer 12 to lid 26 is set forth below.

Figure 7:
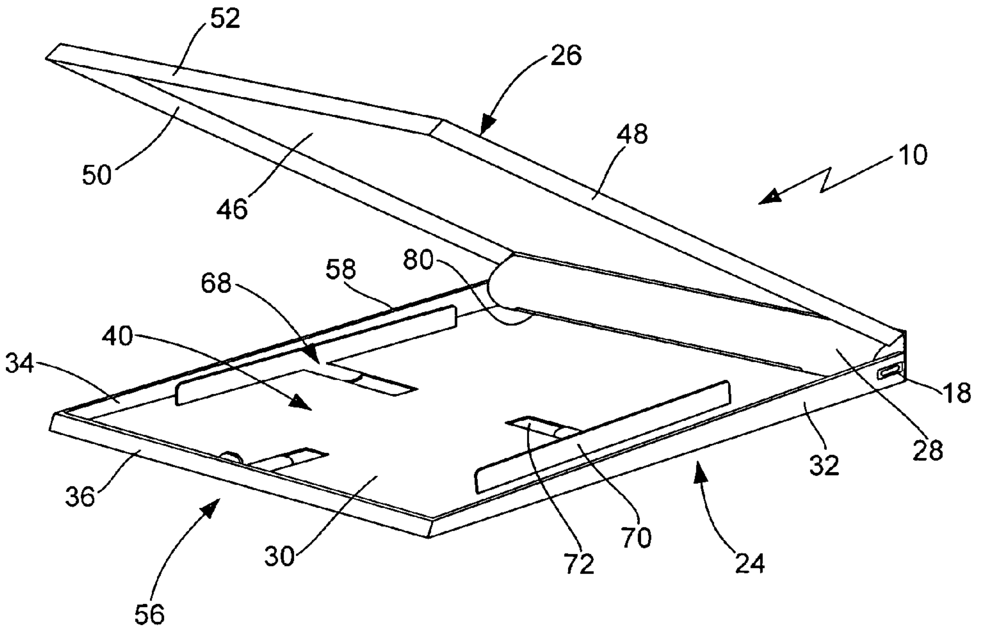
FIG. 7 is a side perspective view of an alternative embodiment of the combination support base and printer of the present invention shown in the open position with a printer module in the printer compartment and a plurality of paper sizing mechanisms defining the paper storage compartment.
Figure 8:
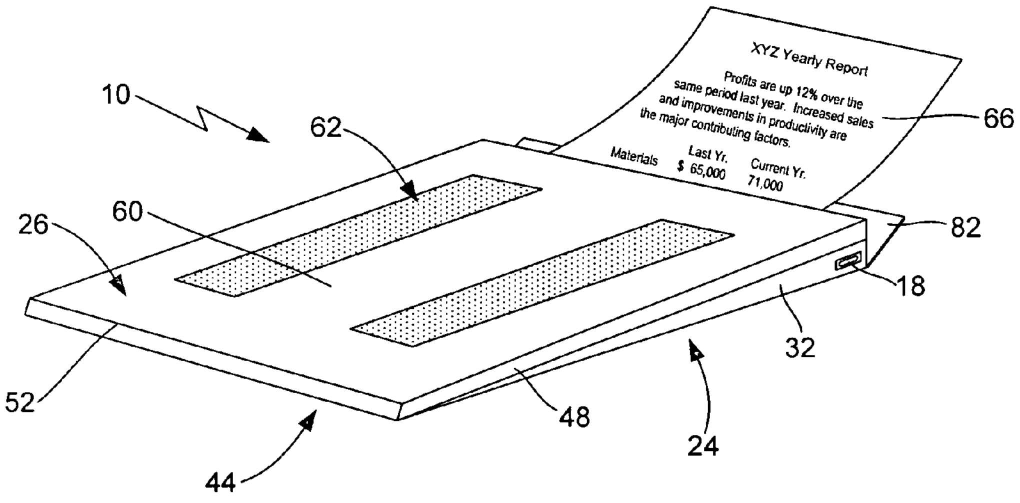
FIG. 8 is a side perspective view of the combination support base and printer of FIG. 7 shown in its closed position with paper being fed through the printer and out the support base.

The paper storage compartment 40 of base/printer 10 of the present invention is configured to hold one or more, preferably a plurality, of sheets of paper, shown as 64 in FIG. 4, therein for printing on by printer module 28. As shown in FIGS. 3 and 4, in a preferred embodiment of the present invention the paper storage compartment 40 is a fixed size and is configured such that the sheets of paper 64 abut against the sidewalls 32/34, front wall 36 and printer module 28 so that no adjustable paper size mechanism is required inside paper storage compartment 40 to hold the sheets of paper 64 in place for retrieval by printer module 28. In the preferred embodiment, paper storage compartment 40 is sized to receive and store for use standard letter sized paper (i.e., 8½" by 11"), A4 paper, legal sized paper or larger sized paper instead of the small and generally not practical sized paper of some prior art devices. In the preferred embodiment, the user can print documents, including but not limited to contracts, bid proposals, invoices, receipts and the like, as well as photographs, drawings and other materials, on a standard letter sized sheet of paper. In the embodiment of FIGS. 7 and 8, the dimensions of base 24 are greater than the dimensions of the sheets of paper 64 that can be utilized with the base/printer 10. To securely hold the sheets of paper 64 in place so that a single sheet, shown as 66 in FIGS. 5 and 8, of the sheets of paper 64 may be properly fed into printer module 28, the paper storage compartment 40 is provided with one or more paper sizing mechanisms 68. Three such paper sizing mechanisms 68 are shown in FIG. 7. In this embodiment, which is commonly utilized in the computer industry for printer paper trays, each of the paper sizing mechanisms 68 comprise a slide member 70 that is slidably engaged in a cooperatively configured slot 72 located in bottom wall 30. The paper sizing mechanisms 68 shown in FIG. 7 are merely intended to be exemplary of the type of mechanisms which can be utilized with base/printer 10 of the present invention to adjust the size of paper storage compartment 40 for the size of the sheets of paper 64 placed therein. Various different configurations for paper sizing mechanism 68 are well known to those skilled in the art of printers and the like and are intended to be included herewith.

Figure 10:
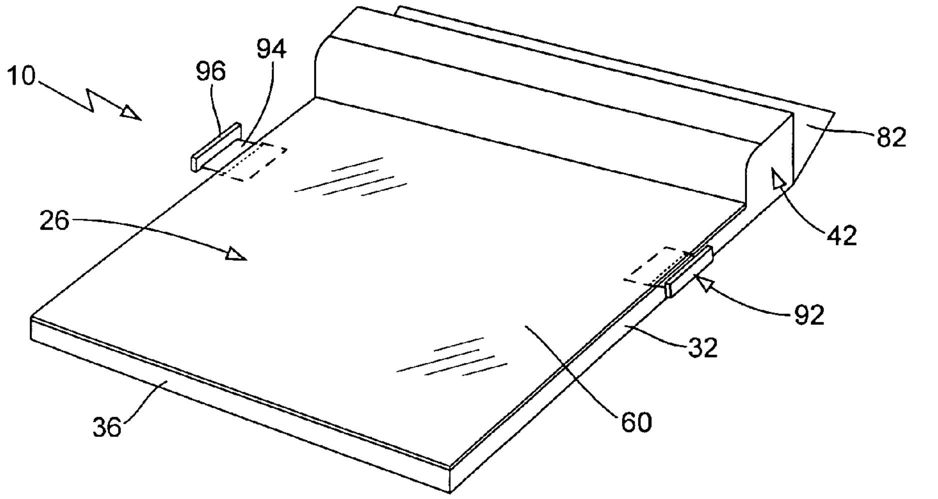
FIG. 10 is a side perspective view of another alternative embodiment of the combination support base and printer of the present invention shown in the closed position with an attachment mechanism thereon to secure the laptop to the support base.
Figure 11:
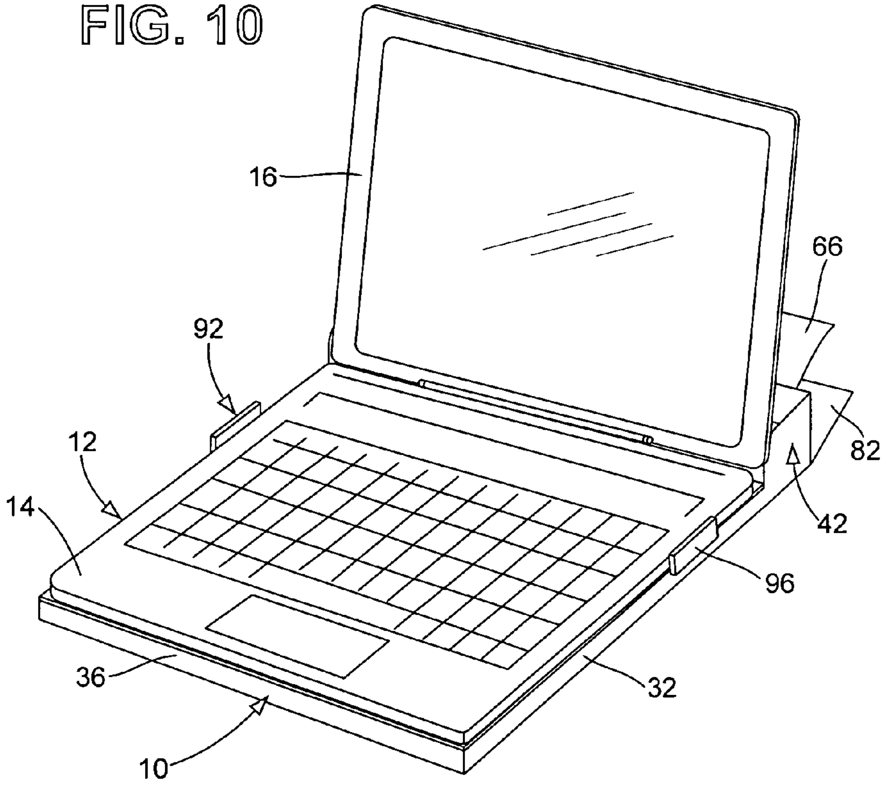
FIG. 11 is a side perspective view of the combination support base and printer of FIG. 10 shown in use with a laptop computer thereon and paper being fed out the support base.

As set forth above, printer compartment 42 is sized and configured to receive printer module 28 therein for use of base/printer 10 to print a single sheet of paper 66 from the one or more, typically a plurality, of sheets of paper 64 in the paper storage compartment 40. In the embodiment shown in FIGS. 1 through 6, the printer compartment 42 is wider than the paper storage compartment 40 forming base/printer 10 into a generally “T” shaped configuration having printer extension members 74 and 76. In this embodiment, the USB port 18 for base/printer 10 is shown positioned in extension member 74. As will be readily apparent to those skilled in the art, however, USB port 18 and/or other ports may be located on extension member 74, sidewalls 32/34, front wall 36, rear wall 38, lid 26 or elsewhere. Preferably, printer compartment 42 is sized and configured to securely receive printer module 28 therein so that it does not slide, wobble or otherwise move around in base/printer 10. As best shown in FIG. 3, the printer compartment 42 will typically include a paper eject slot 78 at rear wall 38 to allow the printer module 28 to eject the single sheet of paper 66 out of base/printer 10 after printing the desired information thereon. In the embodiments of FIGS. 7 through 9, the width of the printer compartment 42 is the same as the width of the paper storage compartment 40, with or without paper sizing mechanisms 68 utilized in paper storage compartment 40. In the embodiments of FIGS. 10 and 11, the printer compartment 42 extends upward and outward from the paper storage compartment 40. Preferably, the printer compartment 42 would be above lid 26 approximately the depth of a typical portable computer 12 when the computer 12 is closed. In this embodiment, lid 26 is shown without edge members 48, 50 and 52.

The printer module 28 utilized with the preferred embodiments of the base/printer 10 of the present invention shown in the figures is configured as a substantially self-contained printing unit that comprises a device to pull the single sheet of paper 66 from the plurality of sheets of paper 64, feed the sheet of paper 66 through the printer module 28, print on the sheet of paper 66 and eject the sheet of paper 66 out of the base/printer 10. To pull the single sheet of paper 66 into the printing apparatus, the printer module will typically include a printer feed slot 80, typically at the base thereof near bottom wall 30, sized and configured for the single sheet of paper 66 to fit therein, as best shown in FIGS. 4 and 7. In the preferred embodiment, printer module 28 will include a printing apparatus that prints on the sheet of paper 66, a power source to power the printing apparatus, a pull and feed mechanism for sheet of paper 66 and any other components, such as ink, that may be necessary for printer module to print on the sheet of paper 66. In the preferred embodiment of the present invention, the power source for the printing apparatus is one or more rechargeable batteries that can be recharged with an attachable power cord (not shown). Preferably, long lasting lithium-ion batteries are utilized. Although other battery systems, including but not limited to nickel-metal hydride and nickel-cadmium batteries may be utilized, these batteries generally do not have the advantages of lithium-ion batteries. In an alternative embodiment, the batteries can be removable from base/printer 10 so the user can replace them as necessary. Typically, for such configuration the printer module 28 will include a compartment for storing the replaceable batteries or the batteries will be located in a separate battery compartment in the printer compartment 42 or elsewhere in base/printer 10.

Various types of printing apparatuses will be suitable for use with base/printer 10 of the present invention. For instance, the printing apparatus can be one of the conventional types of apparatuses, such as an inkjet printer, laser printer or thermal printer. As known to those skilled in the art, each of these types of printing apparatuses have advantages and disadvantages. For instance, the inkjet and laser printers typically produce better quality printing than the standard thermal printers, but they both require a supply of ink, typically provided in the form of a replaceable ink cartridge or the like. If the printing apparatus requires one or more replaceable ink cartridges, then the printer module 28 could be configured with an ink compartment and/or a separate ink compartment can be located in the printer compartment 42 and/or elsewhere in base/printer 10 and be in fluid communication with the printing apparatus to supply ink thereto. As well known in the art, the different types of printing apparatuses are also likely to have different sizing and power requirements that may make one type of printing apparatus preferred over another. Depending on the desired characteristics of base/printer 10 of the present invention, however, each of these may be suitable for use in printer module 28. In addition, less commonly available or new printing apparatuses may also be suitable for use. For instance, Zink Imaging, Inc. has developed a new type of printer that does not require ink, referred to as "zink" for zero ink. The printer and printing process, described at www.zink.com, utilizes specially formulated paper having crystals that are activated by heat from the printer to generate black/white and/or color print on the paper. In addition to the foregoing printing apparatuses, which are set forth for exemplary purposes, other types of printing apparatuses may also be suitable for use with base/printer 10 of the present invention.

As shown in FIGS. 5 and 6, the preferred embodiments of the present invention include one or more paper guides at the back of base/printer 10 to guide the single sheet of paper 66 out of base/printer 10 after it has been printed on by the printing apparatus of printer module 28. In the preferred embodiment, a primary paper guide 82 is utilized at the rear wall 38 of base 24 to direct the single sheet of paper 66 rearward from base/printer 10. The primary paper guide 82 of this embodiment is a separate tray-like structure positioned rearward of rear wall 38 which folds down to angle the ejected paper 66 in a slightly upward direction, as shown in FIG. 5, so the user may easily grasp paper 66 supported thereby. The sheet of paper 66 is ejected by the printer module 28 out the paper eject slot 78 onto paper tray 82. Preferably, the paper tray 82 is pivotally connected to the bottom of rear wall 38 and is configured to engage rear wall 38, the rearward ends of sidewalls 32/34 and/or the rearward end of lid 26 when folded upward to securely close paper tray 82 and hold it against rear wall 38 when not in use. Paper trays such as paper tray 82 are commonly utilized in prior art printers, though typically at the front of the printer. In an alternative embodiment, the paper guide 82 is the rear wall 38, such that when it is folded downward to act as the paper guide 82 the back of the printer module 28 is exposed and the paper 66 is directly ejected onto rear wall/guide 38/82. In the alternative embodiment shown in FIG. 6, the base/printer 10 also includes a secondary paper guide 84 that extends upward and/or outward from the primary paper tray 82 when in use (as shown). Preferably, secondary paper guide 84 is pivotally attached to the primary paper guide 82 (or rear wall 38) so that it may be pivoted downward out of the way, typically to a position alongside or engaged with the primary paper guide 82. The use of secondary paper guide 84 is also familiar to those skilled in the art of printers.

The embodiment of FIG. 6 also includes a pair of side expansion wings 86 and 88 which, effectively, extend the width of support surface 60 to better support wider portable computers 12. Preferably, the side expansion wings 86/88 are sized and configured to fit within a wing cavity 90 associated with each of the side expansion wings 86/88 such that the wings 86/88 are received inside the wing cavities 90 when not in use and can be extended outward when the user desires or needs more support for portable computer 12. The side expansion wings 86/88 are also preferably configured such that they are in a substantially planar relationship with support surface 60 when they are extended outward. This can be achieved by cooperatively configuring the side expansion wings 86/88 and wing cavities 90 such that the wings 86/88 are pulled outward and upward and then locked in place when their use is desired and pushed downward and inward when they are no longer needed. Placing side expansion wings 86/88 back inside their respective wing cavities 90 reduces the likelihood that they may be damaged during movement of base/printer 10.

In the embodiment of the base/printer 10 of the present invention shown in FIGS. 10 and 11, the portable computer 12 is securely held in place on support surface 60 utilizing one or more selectively engageable attachment mechanisms 92. If desired, the attachment mechanisms 92 may be used with or in place of the non-slip mechanism 62 described above. In the embodiment shown in FIGS. 10 and 11, attachment mechanisms 92 comprise a substantially horizontal first or base engaging member 94 and a substantially vertical second or computer engaging member 96 that are configured to clamp portable computer to the support surface 60 of base/printer 10. The base engaging member 94 is configured to slidably, but in a locking manner, engage the side edge members 48/50 of lid 26, if edge members 48/50 are utilized or the sides of lid 60 if they are not used) or the sidewalls 32/34 of base 24. The computer engaging members 96 are configured to engage the sides of the computing portion 14 of portable computer 12 to securely clamp portable computer 12 to the support surface 60 of base/printer 10 of the present invention, as shown in FIG. 11. In the preferred embodiment, base engaging members 94 are associated with the lid 26 so that the user can open lid 26 if access to paper storage compartment 40 or printer compartment 42 is needed or desired. As will be readily apparent to those skilled in the art, various other attachment mechanisms may be utilized with base/printer 10 to attach the portable computer 12 thereto.

Numerous other alternative configurations are also suitable for base/printer 10 of the present invention. Without limiting the scope of available alternative configurations, examples of two alternative configurations are shown in FIGS. 12 and 13. The embodiment of FIG. 12 shows a base/printer 10 having a lid 26 that is configured to cover only the paper storage compartment 40. The lid 26 is shown as being pivotally attached to the separate printer compartment 42 so that the user only has to access the printer compartment 40 when he or she needs to add additional sheets of paper 64 therein. If desired, the printer compartment can be provided with a separate lid that opens when the user needs to access the printer compartment 42, such as to replace printer module 28, add ink, change batteries or perform other printer module-related tasks. Though not shown, the printer lid can be provided with a hinge at or near the hinge 54 for lid 26 such that it opens in a rearward facing direction. Alternatively, access to printer compartment 42 can be provided through the bottom of base/printer 10 or elsewhere on base/printer 10. The embodiment of FIG. 13 shows an alternative configuration for allowing access to the paper storage compartment 40. In this embodiment, front wall 36 is hingedly connected to bottom wall 30 such that it is folded downward (as shown) to allow the user to insert sheets of paper 64 therein for use by the printer module 28. During use, the front wall 36 is folded upward to engage the lid 26 and/or sidewalls 32/34. The lid 26 in this embodiment does not move. Access to printer compartment 42 can be provided through the bottom of base/printer 10 or elsewhere on base/printer 10. Alternatively, front wall 36 can be hingedly attached to the lid 26 and pivot upward to allow access to the paper storage compartment 40 and be pivoted downward to close during use. Likewise, one of the other walls, such as first 32 or second 34 sidewall, can be configured to swing open for insertion of sheets of paper 64 and closed during use.

In each of the embodiments of the base/printer 10 of the present invention, one of the primary benefits is that the base/printer 10 can be made with a very low profile, particularly relative to existing printers, and still print on standard sizes of paper and have a paper tray that allows the user to use the printer without having to feed each sheet of paper into the printer one sheet at a time, as with some prior art devices. In fact, the base/printer 10 can be manufactured with the various benefits described above and have a profile that is less than that of the portable computer 12 with which it can be utilized, as shown in the figures. The low, relatively flat or angled profile of base/printer 10 allows it to be easily carried and/or stored in a briefcase or standard laptop case, along with the portable computer 12. In one embodiment, the rear of the base/printer 10 is approximately two to three inches high and the front of the base/printer 10 is approximately one to two inches high. Base/printer 10 can also be manufactured with the rear and front being the same height, with reversed proportions or with other dimensions and still maintain the preferred low profile.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to various modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A combination support base and printer comprising:

a base having a bottom wall and one or more upstanding walls peripherally disposed about said bottom wall, said bottom wall and said upstanding walls defining a paper storage compartment and a printer compartment in said base, said paper storage compartment configured to store one or more sheets of paper;

a pivotable lid enclosing at least said paper storage compartment, said lid having an upwardly disposed support surface sized and configured to removably support a portable computer thereon when the portable computer is placed on said support surface of said combination support base and printer, wherein the portable computer can be moved and utilized separate from said combination support base and printer when not is use with said combination support base and printer; and a printer module disposed in said printer compartment, said printer module configured to pull one of said one or more sheets of paper into said printer module, print on said one sheet of paper and discharge said sheet of paper out said base.

2. The combination support base and printer according to claim 1, wherein said plurality of upstanding walls comprise a first sidewall, an opposing second sidewall, a front wall and an opposing rear wall.

3. The combination support base and printer according to claim 2, wherein said paper storage compartment is defined by said first sidewall, said second sidewall and said front wall.

4. The combination support base and printer according to claim 3, wherein said paper storage compartment is sized to store letter or larger sized paper.

5. The combination support base and printer according to claim 1, wherein said lid is pivotally connected to said base to allow access to said paper storage compartment when in an open position and support the portable computer when in a closed position.

6. The combination support base and printer according to claim 1, wherein one or more of said upstanding walls is pivotally attached to said bottom wall to allow access to said paper storage compartment.

7. The combination support base and printer according to claim 1 further comprising a paper guide at a rear wall of said base, said paper guide in communication with said printer module to receive and support said one sheet of paper discharged by said printer module.

8. The combination support base and printer according to claim 1, wherein at least one of said walls is configured to support said lid and said portable computer when said portable computer is placed on said support surface.

9. The combination support base and printer according to claim 1 further comprising a non-slip material attached to or integral with said support surface to substantially preventing slipping of the portable computer when the portable computer is removably positioned on said support surface.

10. The combination support base and printer according to claim 1 further comprising an attachment means for securely but removably attaching the portable computer to said support surface.

11. The combination support base and printer according to claim 10, wherein said attachment means comprises one or more base engaging members attached to said lid or said base and a computer engaging member attached to said base engaging member, said computer engaging member configured to engage said portable computer.

12. The combination support base and printer according to claim 10, wherein said attachment means clamps the portable computer to said support surface.

13. The combination support base and printer according to claim 1 further comprising one or more side expansion wings attached to said lid or said base, each of said side expansion wings configured to effectively expand the width of said support surface.

14. The combination support base and printer according to claim 1, wherein said paper storage compartment comprises one or more paper sizing mechanisms configured to abut said one or more sheets of paper in said paper storage compartment.

15. A combination support base and printer comprising:

a base having a bottom wall and one or more upstanding walls peripherally disposed about said bottom wall, said bottom wall and said upstanding walls defining a paper storage compartment and a printer compartment in said base, said paper storage compartment configured to store one or more sheets of paper;

a lid pivotally attached to said base and configured to enclose at least said paper storage compartment, said lid having an upwardly disposed support surface sized and configured to removably support a portable computer thereon when the portable computer is placed on said support surface of said combination support base and printer, at least one of said walls configured to support said lid and the portable computer when the portable computer is placed on said lid, wherein the portable computer can be moved and utilized separate from said combination support base and printer when not is use with said combination support base and printer;

a non-slip material attached to or integral with said support surface to substantially preventing slipping of the portable computer when the portable computer is removably positioned on said support surface; and a printer module disposed in said printer compartment, said printer module configured to pull one of said one or more sheets of paper into said printer module, print on said one sheet of paper and discharge said sheet of paper out said base when said combination support base and printer is in communication with the portable computer.

16. The combination support base and printer according to claim 15, wherein said paper storage compartment is sized to store letter or larger sized paper.

17. The combination support base and printer according to claim 15, wherein said lid is pivotally disposed relative to said base to allow access to said paper storage compartment.

18. The combination support base and printer according to claim 15 further comprising a paper guide at a rear wall of said base, said paper guide in communication with said printer module to receive and support said one sheet of paper discharged by said printer module.

19. The combination support base and printer according to claim 15 further comprising an attachment means for securely but removably attaching the portable computer to said support surface, said attachment means configured to clamp the portable computer to said support surface.

20. The combination support base and printer according to claim 15 further comprising one or more side expansion wings attached to said lid or said base, each of said side expansion wings configured to effectively expand the width of said support surface.

21. The combination support base and printer according to claim 15, wherein said paper storage compartment comprises one or more paper sizing mechanisms configured to abut said one or more sheets of paper in said paper storage compartment.

22. A combination support base and printer comprising:

a base having a bottom wall and a first sidewall, a second sidewall, a front wall and a rear wall peripherally disposed about said bottom wall to define a paper storage compartment and a printer compartment in said base, said paper storage compartment configured to store one or more sheets of paper;

a lid pivotally attached to said rear wall and configured so as to enclose said paper storage compartment and said printer compartment when in a closed position and allow access to at least said paper storage compartment when in an open position, said lid having an upwardly disposed support surface sized and configured to removably support a portable computer thereon when said lid is in said closed position and the portable computer is placed on said support surface of said combination support base and printer, at least one of said first sidewall, said second sidewall and said front wall configured to support said lid and the portable computer when the portable computer is placed on said lid;

means for removably attaching the portable computer to said support surface;

a printer module disposed in said printer compartment, said printer module configured to pull one of said one or more sheets of paper into said printer module, print on said one sheet of paper and discharge said sheet of paper out said base; and a paper guide at said rear wall of said base, said paper guide in communication with said printer module to receive and support said one sheet of paper discharged by said printer module.

23. The combination support base and printer according to claim 22, wherein said attachment means is configured to clamp the portable computer to said support surface.

24. The combination support base and printer according to claim 22 further comprising one or more side expansion wings attached to said lid or said base, each of said side expansion wings configured to effectively expand the width of said support surface.

* * * * *